United States Patent
Umehara et al.

(10) Patent No.: US 10,432,074 B2
(45) Date of Patent: Oct. 1, 2019

(54) VIBRATOR UNIT AND VIBRATION GENERATOR

(71) Applicant: MINEBEA CO., LTD., Kitasaku-gun, Nagano (JP)

(72) Inventors: Mikio Umehara, Yonago (JP); Yutaka Kamogi, Fukuroi (JP)

(73) Assignee: MINEBEA CO., LTD., Kitsaku-gun (JP)

( * ) Notice: Subject to any disclaimer, the term of this patent is extended or adjusted under 35 U.S.C. 154(b) by 444 days.

(21) Appl. No.: 15/285,014

(22) Filed: Oct. 4, 2016

(65) Prior Publication Data

US 2017/0104401 A1 Apr. 13, 2017

(30) Foreign Application Priority Data

Oct. 8, 2015 (JP) .................... 2015-200380

(51) Int. Cl.
  *H02K 33/06* (2006.01)
  *H02K 33/16* (2006.01)
  *B06B 1/04* (2006.01)

(52) U.S. Cl.
  CPC ............. *H02K 33/16* (2013.01); *B06B 1/045* (2013.01); *H02K 33/06* (2013.01)

(58) Field of Classification Search
  CPC .............................. H02K 33/06; H02K 33/16
  See application file for complete search history.

(56) References Cited

U.S. PATENT DOCUMENTS

| 6,542,381 B1 | 4/2003 | Sei et al. |
| 2014/0202252 A1 | 7/2014 | Umehara |

FOREIGN PATENT DOCUMENTS

| JP | H09-233869 A | 9/1997 |
| JP | 2001-29887 | 2/2001 |
| JP | 2002-126644 A | 5/2002 |
| JP | 2014-140785 A | 8/2014 |

OTHER PUBLICATIONS

Jan. 31, 2018 drafted Office Action issued in Japanese Patent Application No. 2015-200380.
Oct. 5, 2017 drafted Office Action issued in Japanese Patent Application No. 2015-200380.

*Primary Examiner* — Ramon M Barrera
(74) *Attorney, Agent, or Firm* — Oliff PLC

(57) ABSTRACT

A vibrator unit capable of being attached to a housing of a vibration generator includes a vibrator including a magnet and a back yoke arranged on or above the magnet, and an elastic member. The elastic member includes a vibrator attachment part attached to the vibrator, a housing attachment part attached to the housing, and an arm part coupling the vibrator attachment part and the housing attachment part, said arm part displaceably supporting the vibrator attachment part at least in a horizontal direction with respect to the housing attachment part. The back yoke includes a planar part arranged on or above the magnet and a holding part bending the planar part toward the frame from the planar part. The vibrator attachment part is held and embraced by the holding part.

14 Claims, 12 Drawing Sheets

VIBRATOR UNIT AND VIBRATION GENERATOR

CROSS REFERENCE TO RELATED APPLICATIONS

This application claims the benefit of Japanese Patent Application No. 2015-200380, filed Oct. 8, 2015, which is hereby incorporated by reference in its entirety.

BACKGROUND

Technical Field

The present disclosure relates to a vibrator unit and a vibration generator, and in particular relates to a vibrator unit including a vibrator for use in a vibration generator that generates vibration by moving a vibrator with a current flowing through a coil, and a vibration generator therefor.

Background Art

As a vibration generator that generates vibration by moving a vibrator, a variety of vibration generators are in use. The vibration generator has a structure in which a vibrator is supported by a housing via a spring part. The vibrator includes a magnet. This type of vibration generator includes a coil disposed under the magnet so as to face the magnet. The vibrator moves while causing the spring part to deform in response to a current flowing through the coil.

Japanese Unexamined Application Publication No. 2014-140785 describes a vibration generator in which a component formed of an elastic body integrally with an arm part serving as a spring part is used as a holding part that holds a vibrator. In this vibration generator, the component formed of an elastic body includes a slit formed therein, and a projecting part of a back yoke is fitted in the slit, so that this component and the back yoke are connected.

However, the above structure described in Japanese Unexamined Application Publication No. 2014-140785, in which the projecting part of the back yoke is fitted in the slit of the component made of an elastic body so as to connect both components, has a problem in that the joint part of both components becomes fatigued as the vibrator repeatedly vibrates. The advance of fatigue at the joint part changes its securing state, thereby causing problems such as characteristic change of the vibration generator or breakdown of the vibration generator due to fracturing of the component made of an elastic body. These problems can arise even if the back yoke and the component made of an elastic body are integrally formed.

The present disclosure is related to providing a highly-durable vibrator unit and vibration generator.

SUMMARY

In accordance with one aspect of the present disclosure, a vibrator unit capable of being attached to a housing of a vibration generator is provided, the vibrator unit including: a vibrator including a magnet and a back yoke arranged on or above the magnet; and an elastic member including: a vibrator attachment part attached to the vibrator; a housing attachment part attached to the housing; and an arm part coupling the vibrator attachment part and the housing attachment part, said arm part displaceably supporting the vibrator attachment part at least in a horizontal direction with respect to the housing attachment part, the back yoke including a planar part arranged on or above the magnet and a holding part bending the planar part toward the frame from the planar part, the vibrator attachment part being held and embraced by the holding part.

Preferably, the holding part includes a hole, the vibrator attachment part includes a projecting part, and the projecting part is fitted in the hole.

Preferably, the holding part includes a first part having a planar part and a lateral face and a second part bent toward the inside of the vibrator from the end portion of the side face part, the magnet is arranged at the first part, one of the first part and the second part includes a first hole, and the other of the first part and the second part includes a second hole, and the vibrator attachment part includes a first projecting part fitted in the first hole and a second projecting part fitted in the second hole.

Preferably, the first projecting part is arranged closer to a side end portion of the holding part compared to the second projecting part.

Preferably, the first hole has a shape extending outward in the back yoke, with respect to a shape having a same dimension as a dimension of the first projecting part, and the vibrator attachment part attached to the vibrator is rotatable with the first projection being inserted in the first hole.

Preferably, the elastic member is a single molded body formed with an elastic body, and the housing attachment part, the arm part and the vibrator attachment part are mutually coupled.

Preferably, two of the arm parts are coupled to two portions of the vibrator attachment part, respectively, and two of the housing attachment parts are coupled to the two arm parts, respectively.

Preferably, the vibrator unit includes two of the elastic members, and the holding part arranged at a first side part, and the holding part arranged at a second side part of the back yoke, the second side part being at a side opposite to the first side part, and the respective vibrator attachment parts of the two elastic members are attached to the two holding parts at the first side part and the second side part, respectively.

Preferably, the vibrator unit further includes a weight disposed at an outer periphery of the magnet, and the vibrator attachment part is sandwiched between a side part of the weight and a part of the holding part.

In accordance with another aspect of the present disclosure, a vibration generator includes a housing; the vibrator unit capable of being attached to a housing of a vibration generator, the vibrator unit including a vibrator including a magnet and a back yoke arranged on or above the magnet, and an elastic member including a vibrator attachment part attached to the vibrator, a housing attachment part attached to the housing, and an arm part coupling the vibrator attachment part and the housing attachment part, said arm part displaceably supporting the vibrator attachment part at least in a horizontal direction with respect to the housing attachment part, the back yoke including a holding part provided by bending a side end portion of a planar part arranged on or above the magnet, the vibrator attachment part being held and embraced by the holding part, the vibrator unit being displaceably attached to the housing and holding the vibrator with respect to the housing; and a coil configured to allow a current to flow through to change at least one of a position and a posture of the vibrator with respect to the housing.

In accordance with the present disclosure, the vibrator attachment section is attached to the holding section of the back yoke with the projecting section fitted in the hole. Thus, a highly-durable vibrator unit and vibration generator can be provided.

DETAILED DESCRIPTION

Hereinafter, a vibration generator including a vibrator unit in accordance with an embodiment of the present disclosure will be described.

The vibration generator has a structure that a vibrator holding a magnet is displaceably supported by a housing with respect to the housing. A coil is disposed in the vicinity of the vibrator. A current flows through the coil to change at least one of the position and the posture with respect to the housing in a magnetic field generated by the magnet. The vibration generator is a so-called linear type vibration generator which generates a vibration force by reciprocating a vibrator in response to a current flowing through a coil.

EMBODIMENTS

Figure 1:
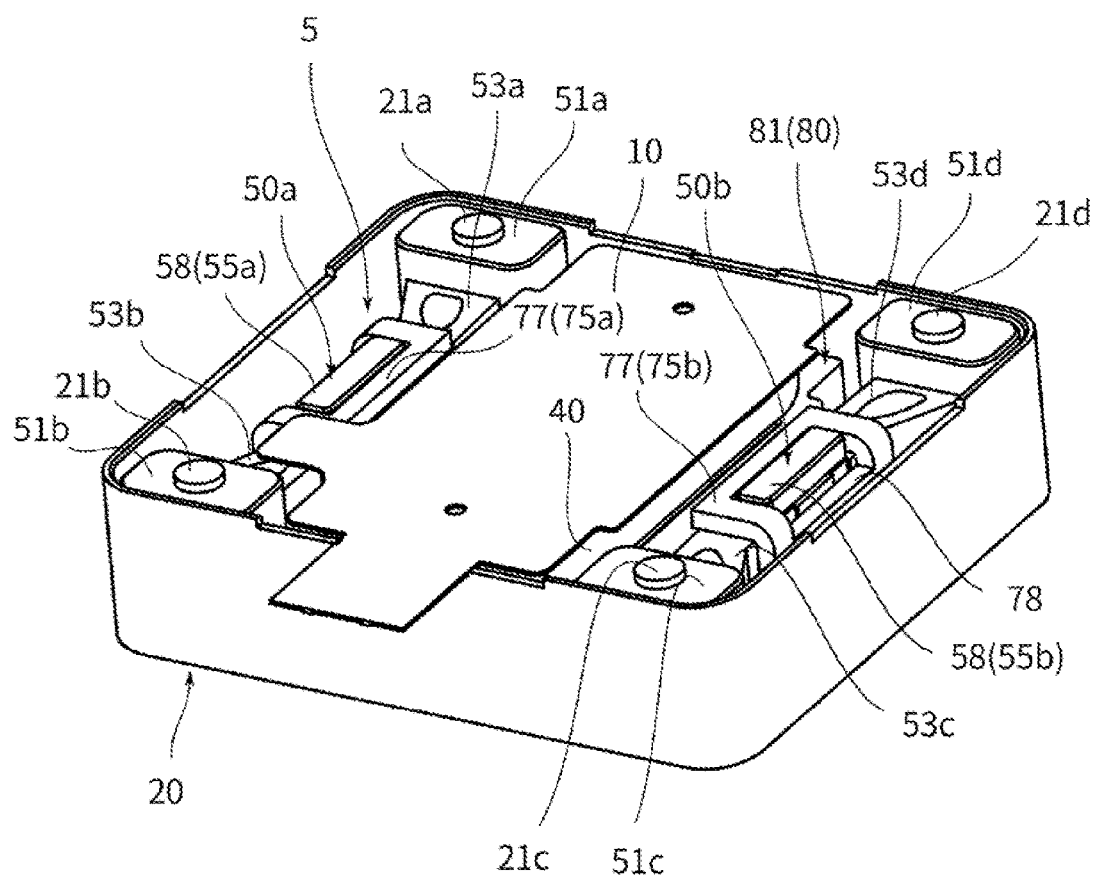
FIG. 1 is a perspective view showing a vibration generator in accordance with one embodiment of the present disclosure.
Figure 1:
Figure 2:
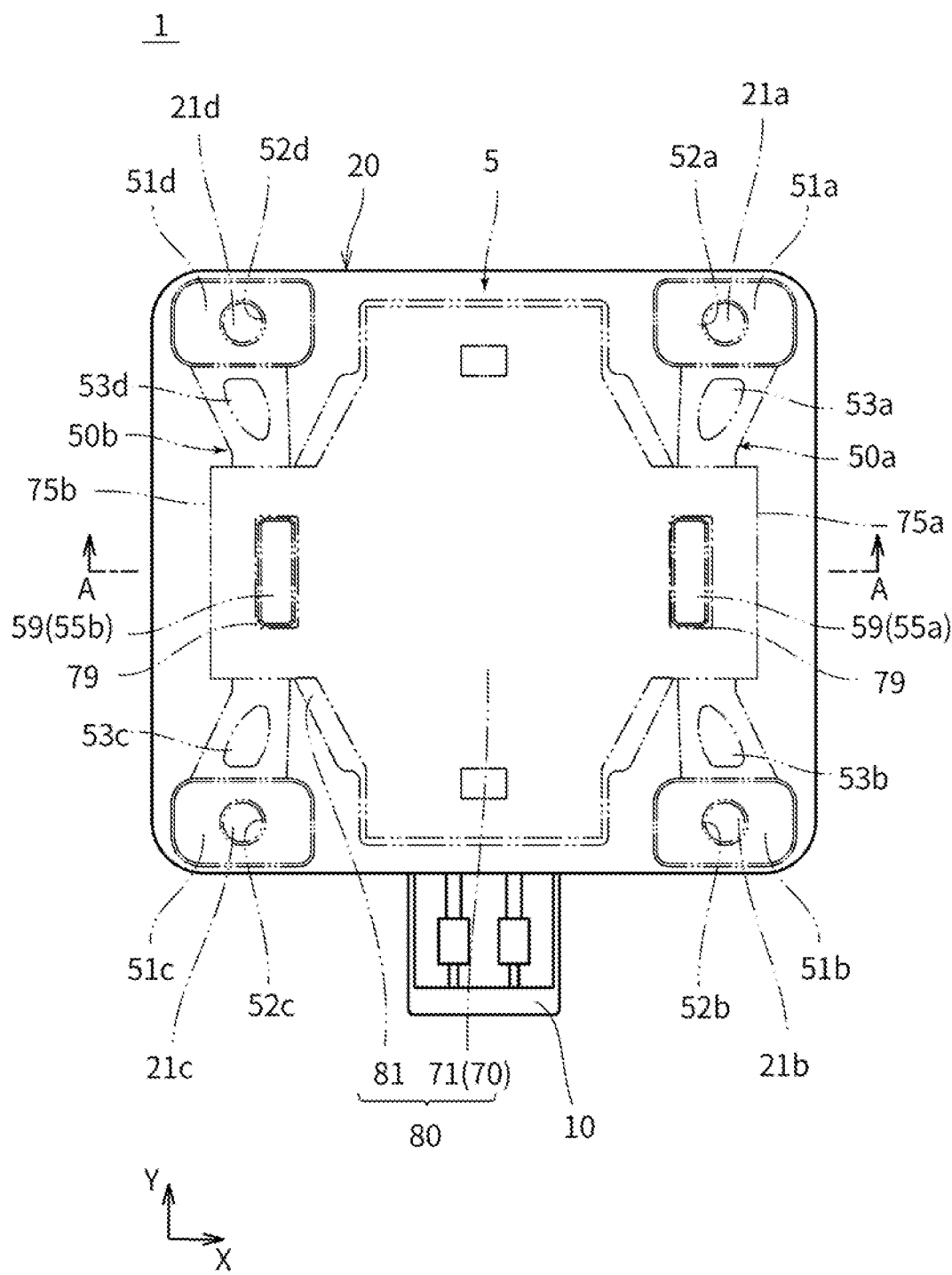
FIG. 2 is a plan view showing the vibration generator.
Figure 3:
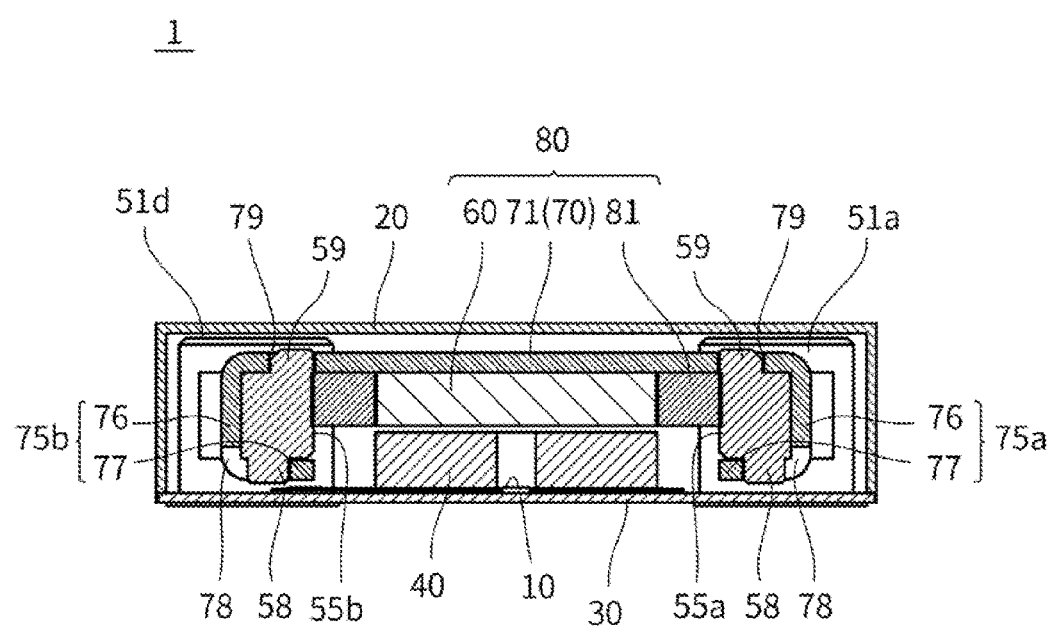
FIG. 3 is a cross-sectional view taken along Line A-A of FIG. 2.
Figure 3:

FIG. 1 is a perspective view showing a vibration generator 1 in accordance with one embodiment of the present disclosure. FIG. 2 is a plan view showing the vibration generator 1. FIG. 3 is a cross-sectional view taken along Line A-A of FIG. 2.

In FIG. 1, a bottom plate 30 (shown in FIG. 3) is omitted. In FIG. 2, to facilitate understanding of the parts layout of a vibrator unit 5 in the vibration generator 1, the vibrator unit 5 is shown by a two-dotted dashed line.

In the following description, as to the vibration generator 1, the X-axis direction of coordinates shown in FIG. 1 can be referred to as the right-left direction (when seen from the point of origin, the positive direction of the X-axis is towards the right), the Y-axis direction can be referred to as the front-back direction (when seen from the point of origin, the positive direction of the Y-axis is towards the back), and the Z-axis direction (direction perpendicular to the X-Y plane of FIG. 2) can be referred to as an up and down direction (when seen from the point of origin, the positive direction of the Z-axis is upwards).

Overall Structure of the Vibration Generator 1

As shown in FIG. 1, the vibration generator 1 mainly includes a substrate 10, a frame 20, the bottom plate 30 (shown in FIG. 3), a coil 40 and the vibrator unit 5. As shown in FIG. 2, the vibrator unit 5 includes two elastic members 50 (50a, 50b) and a vibrator 80. The two elastic members 50 include four housing attachment parts 51 (51a, 51b, 51c, 51d) in total, four arm parts 53 (53a, 53b, 53c, 53d) in total, and two vibrator attachment parts 55 (55a, 55b) in total. The vibrator 80 is coupled to the two vibrator attachment parts 55. As shown in FIG. 3, the vibrator 80 includes a magnet 60, a back yoke 70 and a weight 81. A weight part including the magnet 60 and the weight 81 is attached to the back yoke 70.

The vibration generator 1 is formed into a thin, substantially rectangular parallelepiped shape as a whole. The vertical dimension of the vibrator generator 1 is relatively small. For example, the vibration generator 1 is a small type vibration generator having an outside dimension of approximately 10-20 millimeters in each of the right-left direction and the front-back direction. The vibration generator 1 includes a box-shaped housing having left, right, front and back side faces and an upper face constituted by the frame 20 and a bottom face covered with the bottom plate 30.

In the present embodiment, the frame 20 is formed with a non-magnetic metal. The back yoke 70 is formed with a soft magnetic material such as iron. The frame 20 may be formed with a resin or the like.

The substrate 10, for example, a flexible print circuit board (FPC), is disposed on the or above bottom plate 30 and is sandwiched and arranged between the coil 40 and the bottom plate 30. The substrate 10 is provided with a terminal configured to be coupled to the coil 40, a terminal for coupling a power supply, etc. to the substrate 10, and the like. A part of the substrate 10 where the terminal for coupling a power supply, etc. is provided extends to, for example, the outside of the housing (the frame 20 and the bottom plate 30).

The bottom plate 30 of the present embodiment has a flat-plate shape. The bottom plate 30 is fitted in a part at the bottom face side of the frame 20 and fixed to the frame 20. The bottom plate 30 is formed with a non-magnetic material such as non-magnetic stainless steel. Because the vibration generator 1 is surrounded by the frame 20 and the bottom plate 30, the vibration generator 1 can be handled more easily, and also the durability of the vibration generator 1 is improved. The bottom plate 30 may be formed with a resin.

The bottom plate 30 is provided with poles 21 (21a, 21b, 21c, 21d). The poles 21 are disposed at the respective four corners of the bottom plate 30 in a planar view. Each of the four poles 21 is a pin having a tubular shape. Each pole 21 is disposed such that its longitudinal direction is oriented in the up and down direction, namely, substantially perpendicularly to a direction in which the vibrator 80 moves. Each pole 21 has substantially the same length as a height of an internal portion of the housing surrounded by the frame 20 and the bottom plate 30. Each pole 21 is formed with a metal such as iron, but the material is not limited thereto. For example, each pole 21 may be formed with a resin. Moreover, the poles 21 may be attached to the frame 20.

The frame 20 has a rectangular parallelepiped shape as a whole, the bottom part being open. The frame 20 forms the housing. In a planar view, each of the corners of the frame 20 (namely, the portions between the side faces) includes a round shaped portion between the side faces. As shown in FIG. 3, the frame 20 is disposed from above so as to cover the upper face of the bottom plate 30 and is attached to the bottom plate 30.

The coil 40 is, for example, an air-core coil having an elliptical, flat-plate shape as a whole, which is formed by winding a conductive wire. That is, the coil 40 is a thin coil, the dimension of which is smaller in a winding axis direction than in a direction perpendicular to the winding axis direction. The coil 40 may be formed by slicing wound metal foil or by laminating sheet coils. Moreover, the coil 40 may have a circular shape or a polygonal shape such as a quadrangular shape in a planar view.

As shown in FIG. 3, the coil 40 is disposed on the upper face of the substrate 10 such that the winding axis direction is oriented in the up and down direction. The coil 40 is disposed to face the vibrator 80 at the center of the vibration generator 1 in a planar view. The coil 40 is insulated from the bottom plate 30. Both of the winding end portions of the coil 40 are coupled to the terminals provided on an upper face side of the substrate 10.

Figure 4:
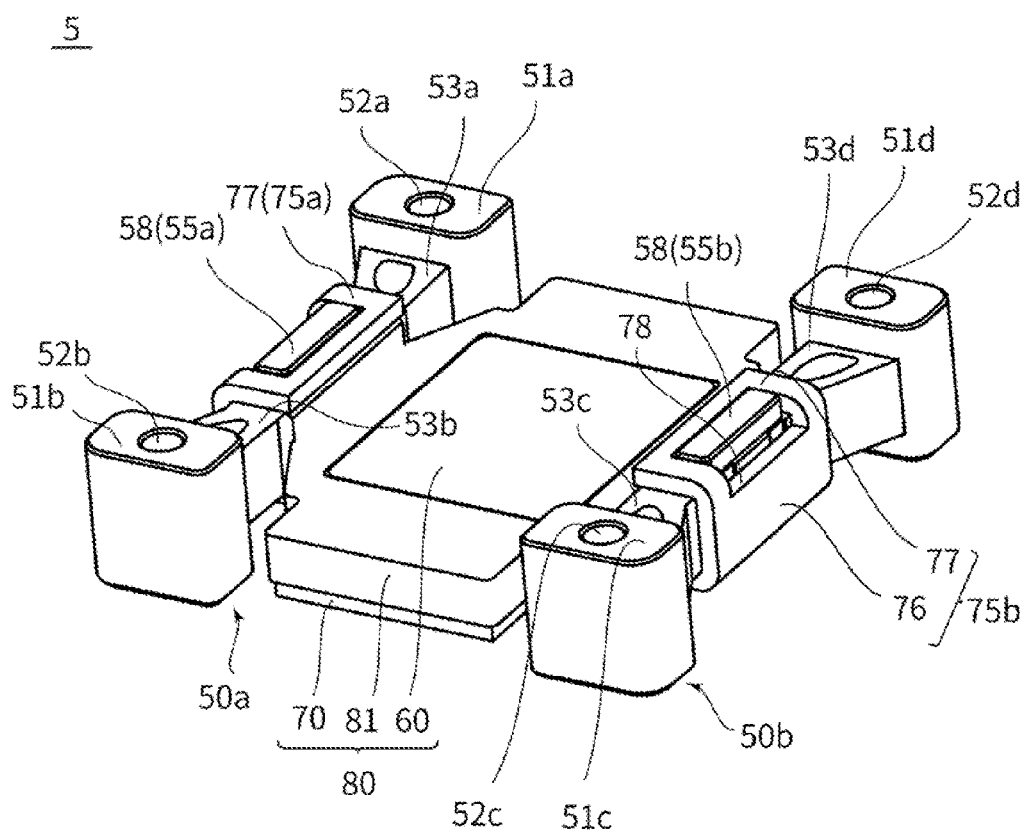
FIG. 4 is a perspective view showing a vibrator unit.
Figure 5:
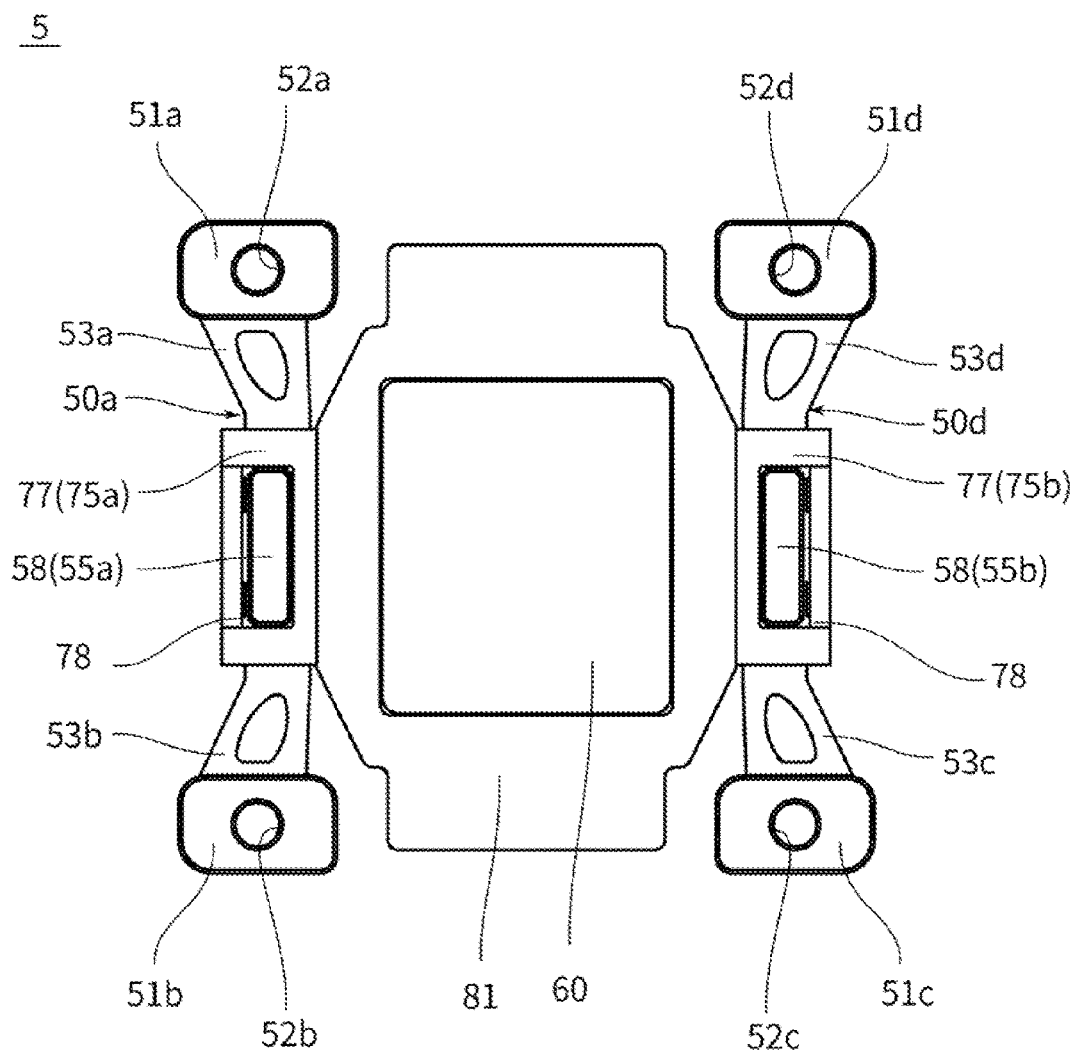
FIG. 5 is a bottom view showing the vibrator unit.

FIG. 4 is a perspective view showing the vibrator unit 5. FIG. 5 is a bottom view showing the vibrator unit 5.

As shown in FIG. 4, the vibrator unit 5 has a structure in which the vibrator 80 holds the two elastic members 50 by means of holding parts 75 (75a, 75b) provided at respective right and left end portions of the back yoke 70.

The vibrator 80 includes the magnet 60, the back yoke 70 and the weight 81. The magnet 60 has a plate-like shape parallel to a horizontal plane. The weight 81 is formed to surround the side parts of the magnet 60. As shown in FIG. 3, the back yoke 70 is attached to the weight part including the magnet 60 and the weight 81 such that a planar part 71 is positioned on the upper face of the weight part. The planar part 71 is arranged on or above the magnet 60.

The weight part is fixed to the back yoke 70 with the magnet 60 being attracted to the back yoke 70 with a magnetic attractive force. The weight 81 and the magnet 60 are fixed to each other by, for example, welding. The weight 81 may be adhered to the back yoke 70.

Each of the elastic members 50 is, for example, a single molded component formed with an elastic body. For example, resins such as a heat-resistant fluorine rubber or silicon rubber can be used as the elastic body. The use of such a rubber to form the elastic members 50 enhances heat resistance properties of the vibration generator 1. Each of the elastic members 50 is a single molded component formed with resin. The elastic body is not limited thereto, and various materials such as metal materials having spring characteristics can be used. An example of the metal materials is phosphor bronze. The elastic member 50 is a single molded component formed with metal materials.

As to each of the elastic members 50, the housing attachment parts 51, the arm parts 53 and the vibrator attachment part 55 are coupled to each other and integrated. Each elastic member 50 is an integrally-molded body made of a resin, which is formed as a single component by using an elastic body. That is, each of the housing attachment parts 51, the arm parts 53 and the vibrator attachment part 55 constitutes a part of the elastic members 50. Specifically, a right elastic member 50a includes housing attachment parts 51a and 51b, a vibrator attachment part 55a and arm parts 53a and 53b. A left elastic member 50b includes housing attachment parts 51c and 51d, a vibrator attachment part 55b and arm parts 53c and 53d. The housing attachment parts 51a, 51b, 51c and 51d are parts of the elastic member 50 coupled to the frame 20 serving as the housing. The arm parts 53a, 53b, 53c and 53d are parts of the elastic members 50. The elastic members 50 vibratably supports the vibrator 80 along a face of the frame 20 facing the vibrator 80. The arm parts 53a, 53b, 53c and 53d support the vibrator 80 at least in the horizontal direction with respect to the frame 20. The vibrator attachment parts 55a, 55b are parts of the elastic member 50 coupled to the vibrator 80.

The two housing attachment parts 51a and 51b are coupled to the vibrator attachment part 55a via the two the arm parts 53a and 53b, respectively. The two housing attachment parts 51c and 51d are coupled to the vibrator attachment part 55b via the two arm parts 53c and 53d, respectively. Each arm part 53 is formed such that its longitudinal direction is oriented in the front-back direction. That is, the arm parts 53a and 53b are provided between the vibrator attachment part 55a that holds the right side end portion of the vibrator 80 and the housing attachment parts 51a and 51b, respectively. The arm parts 53c and 53d are provided between the vibrator attachment part 55b that holds the left side end portion of the vibrator 80 and the housing attachment parts 51c and 51d, respectively. The respective arm parts 53 are coupled to parts of the vibrator attachment parts 55a and 55b at the side of the vibrator 80. A combination of one arm part 53 and one housing attachment part 51 is disposed, in a plan view, upwardly and downwardly of each of the vibrator attachment parts 55a and 55b.

The vibrator unit 5 is arranged above the bottom plate 30 such that the respective housing attachment parts 51 are fitted in the poles 21. Specifically, the housing attachment parts 51 are disposed at positions corresponding to the respective poles 21. The housing attachment parts 51 are provided with hole parts 52 (52a, 52b, 52c, 52d). Each hole part 52 has, for example, a tubular shape.

As shown in FIG. 1, the housing attachment parts 51 are attached to the bottom plate 30 such that the poles 21 are fitted in the hole parts 52. A part of an outer circumferential face of each housing attachment part 51 is provided along an inner circumferential face of the frame 20 and in contact with the inner circumferential face in a state that the vibrator unit 5 is attached to the bottom plate 30. Thereby, the housing attachment parts 51 are positively held without change in the positions and the postures with respect to the frame 20 and the bottom plate 30.

The vibrator 80 mainly moves in a horizontal direction, particularly in the right-left direction. That is, the arm parts 53 have a shape that can be easily deformed in the right-left direction and displaceably support the vibrator attachment parts 55 at least horizontally with respect to the housing attachment parts 51.

Each arm part 53 includes two branch parts. The two branch parts come closer to each other toward the vibrator attachment part 55 and form a shape of "V" in a planar view. Thus, it is possible to suppress concentration of stress exerted on the arm parts 53 when the arm parts 53 are deformed, thereby increasing the service life of the vibration generator 1. In addition, the shape of the arm parts 53 is not limited thereto.

As to the vibrator unit 5 of the present embodiment in a natural state (e.g., a state where the vibrator unit 5 is not attached to the frame 20), a distance between the housing attachment part 51a and the housing attachment part 51b is smaller than a distance between the central axes of the pole 21a and the pole 21b. Moreover, in this natural state, a distance between the housing attachment part 51c and the housing attachment part 51d is smaller than the distance between the central axes of the poles 21c and the poles 21d. Thus, when the vibrator unit 5 is attached to the frame 20, each arm part 53 is slightly extended in the longitudinal direction than in the natural state. That is, in a state where the vibrator unit 5 is attached to the frame 20, each arm part 53 is elastically deformed from the natural state and extended. Each arm part 53 is extended to such a degree that, for example, the distance between the housing attachment parts 51 becomes approximately 1.2-1.5 times longer than that in the natural state, but the amount of extension is not limited thereto. Moreover, the distance between the housing attachment part 51*a* and the housing attachment part 51*d* and the distance between the housing attachment part 51*b* and the housing attachment part 51*c* may be smaller than the distance between the central axes of the corresponding poles 21.

In this manner, the vibrator unit 5 is attached to the frame 20 with each arm part 53 being extended from the natural state, and thus, restoring forces of the four arm parts 53 generate tension in the vibrator unit 5. Here, since vectors of the restoring forces differ from each other, the vibration generator 1 is stabilized non-freely. This enables the vibration generator 1 to immediately vibrate in response to displacement of the vibrator 80 when a current flows through the coil 40, thereby high responsivity for vibration generation can be achieved. In other words, the coil 40 is configured to allow a current to flow through to change at least one of a position and a posture of the vibrator 80 with respect to the housing (the frame 20 and the bottom plate 30).

Figure 6:
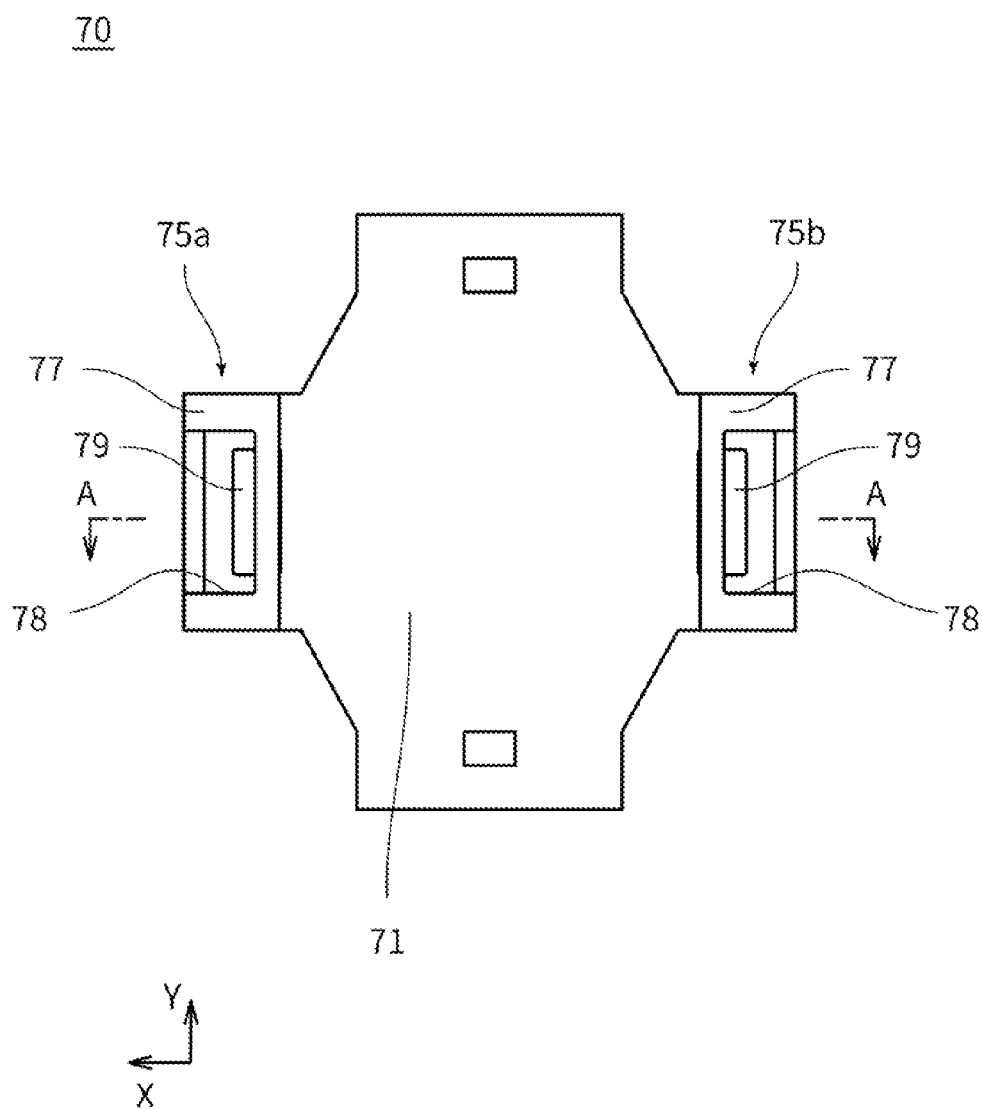
FIG. 6 is a bottom view showing a back yoke.
Figure 7:
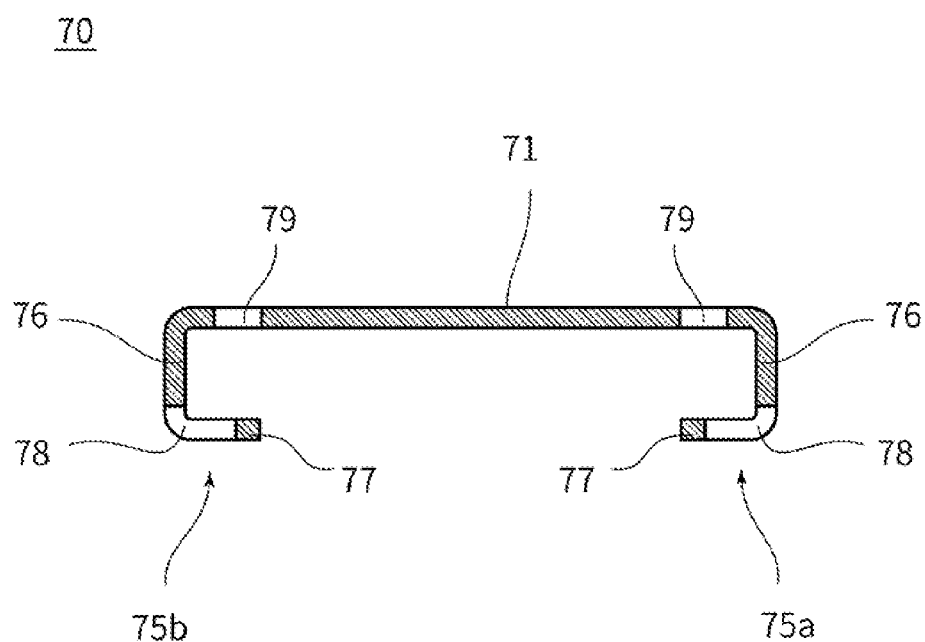
FIG. 7 is a cross-sectional view taken along Line A-A of FIG. 6.
Figure 7:
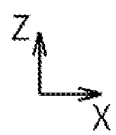
Figure 8:
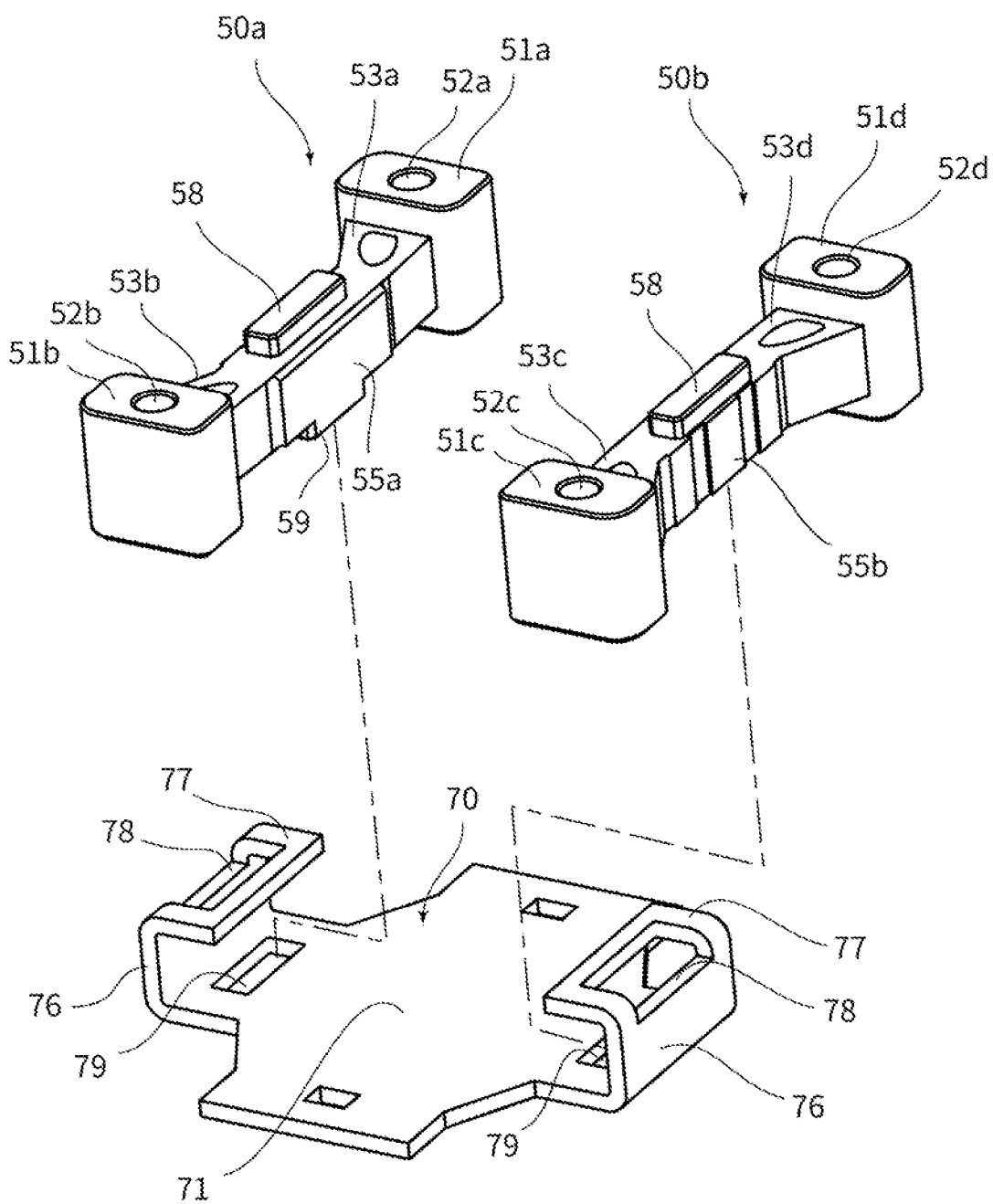
FIG. 8 is a perspective view for explaining a structure of attachment the elastic member on the back yoke.

FIG. 6 is a bottom view of the back yoke 70. FIG. 7 is a cross-sectional view taken along Line A-A of FIG. 6. FIG. 8 is a perspective view for explaining a structure of attachment the elastic members 50 on the back yoke 70.

As shown in FIG. 7, the back yoke 70 includes the holding parts 75 (75*a*, 75*b*) bent from the planar part 71 at which the weight part (the weight 81 and the magnet 60) is disposed. And the holding parts 75 (75*a*, 75*b*) bend from the planar part 71 toward the frame 20. Each holding part has a shape bent downward from the planar part 71, i.e., bent toward a face side of the back yoke 70, in the face the weight part is disposed. Specifically, each holding part 75 includes a part constituted by the planar part 71, a side face part 76, and a bent-inward part (one example of the second part) 77. At the planar part 71 (one example of the first part; hereinafter, this can be simply referred to as the planar part 71), the weight part is disposed. The side face part 76 are parts formed by bending the right and left side end portions of the planar part 71 downwards substantially perpendicularly. The side face parts 76 serve as right and left side face parts of the back yoke 70. The bent-inward part 77 is a part formed by bending the lower end portion of the side face part 76 substantially perpendicularly to an inward side of the back yoke 70 and is bent toward the inside of the vibrator 80 from the lower end portion of the side face part 76. In other words, the bent-inward part 77 is a part bent toward the side where the weight part is provided at a tip of the part bent downward from the planar part 71. The planar part 71, the side face part 76 and the bent-inward part 77 are formed to hold the vibrator attachment part 55 of the elastic member 50 by sandwiching the vibration attachment part 55 from above and below in such a manner that the vibrator attachment part 55 is embraced from three directions, i.e., the upper face, the outer side face and the bottom face. In other words, the planar part 71, the side face part 76, and the bent-inward part 77 surround parts of the vibrator attachment part 55. Examples of the parts include an outer circumferential face of the vibrator attachment part 55.

Each holding part 75 includes a first hole 78 and a second hole 79 formed therein. The first hole 78 is formed in the bent-inward part 77. The second hole 79 is formed in the planar part 71. The two holes 78 and 79 are symmetrically formed in the holding parts 75*a* and 75*b*. That is, the holding parts 75*a* and 75*b* have a symmetrical shape.

In the present embodiment, the first holes 78 are positioned outward of the second holes 79 so as to correspond to the positions of the projecting parts 58 and 59 formed on the vibrator attachment parts 55 as described below.

In the present embodiment, each first hole 78 has, as described below, a shape extending outward in the back yoke 70, with respect to a shape having the same dimension as the dimension of the first projecting part 58 formed in the vibrator attachment part 55 (the minimum dimension to fit the first projecting part 58 therein). As shown in FIG. 7, each first hole 78 has such a shape that a part of the side face part 76 is cut. In other words, each first hole 78 extends from the bent-inward part 77 toward the side face part 76.

As shown in FIG. 8, the first projecting part 58 to be fitted in the first hole 78 and the second projecting part 59 to be fitted in the second hole 79 are formed in the vibrator attachment part 55 of each elastic member 50. The first projecting part 58 is formed to project downward from the bottom face of the vibrator attachment part 55. The second projecting part 59 is formed to project upward from the upper face of the vibrator attachment part 55. In the vibrator unit 5, the first projecting part 58 is disposed further outward compared to the second projecting part 59 (at a position closer to the side end portion of the holding part 75). Particularly, in the present embodiment, the first projecting part 58 is disposed at a position closer to the outer side face of the vibrator attachment part 55, and the second projecting part 59 is disposed at a position closer to the inner side face of the vibrator attachment part 55.

The dimension of the first projecting part 58 in the front-back direction is approximately the same as or slightly smaller than that of the first hole 78 in the front-back direction. Further, the dimension of the second projecting part 59 in the front-back and right-left direction is approximately the same as or slightly smaller than that of the second hole 79 in the front-back and right-left direction.

The vibrator attachment parts 55 are attached to the holding parts 75 such that the projecting parts 58 and 59 are fitted in the holes 78 and 79, respectively.

Figure 9:
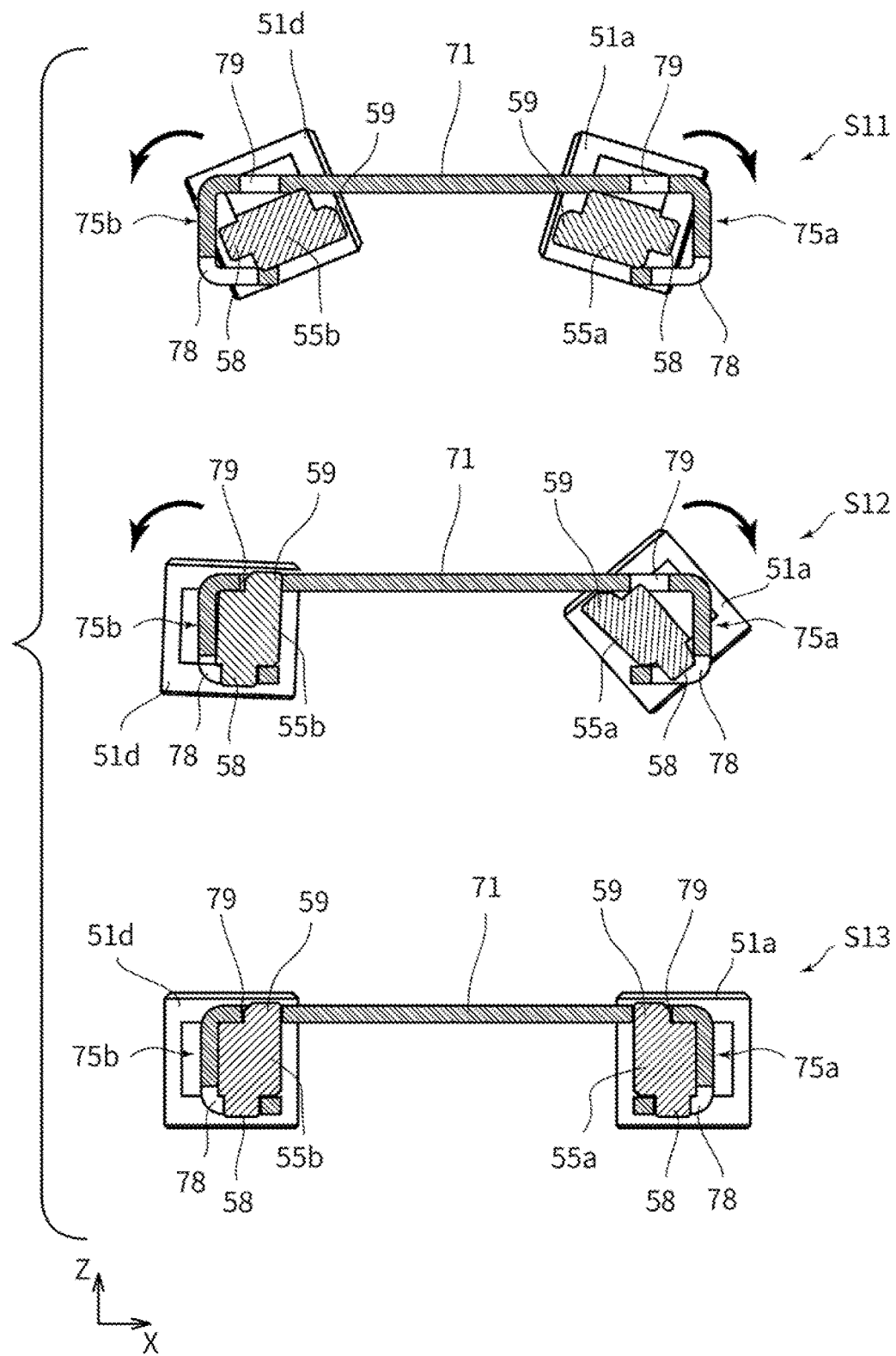
FIG. 9 is a cross-sectional view for explaining a structure of attachment an elastic member on the back yoke.
Figure 10:
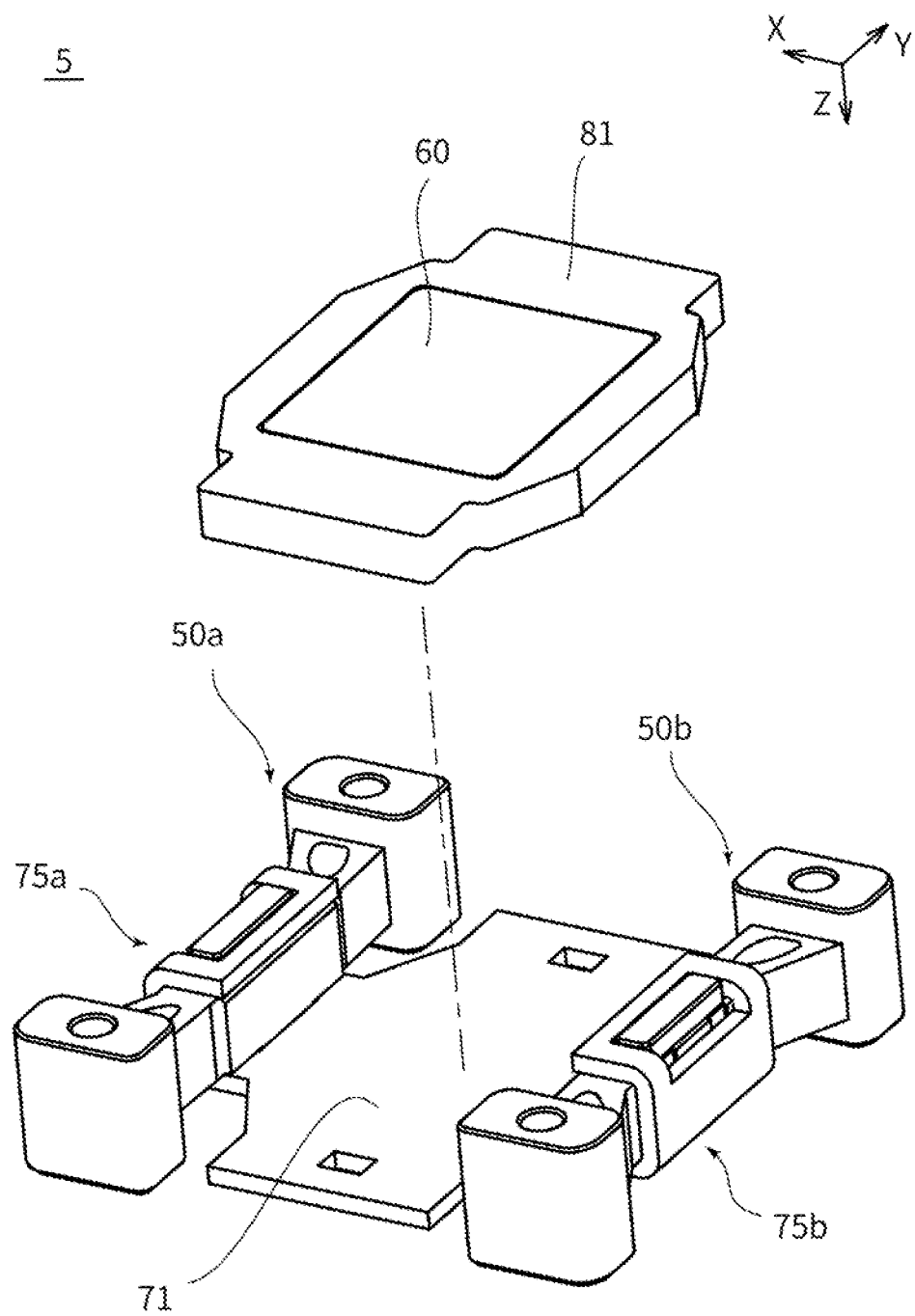
FIG. 10 is a perspective view for explaining a structure of securing the elastic member.
Figure 11:
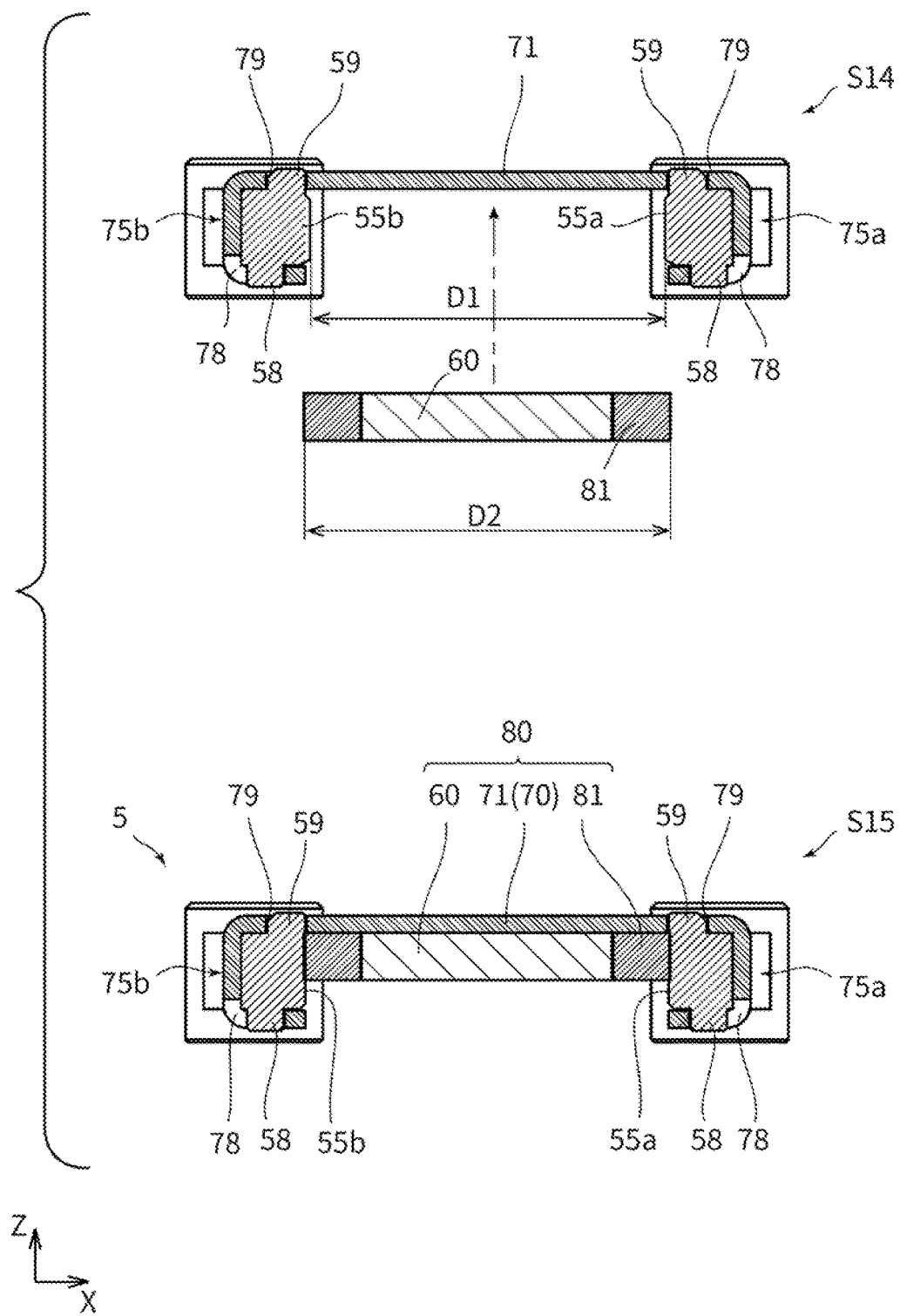
FIG. 11 is a cross-sectional view for explaining the structure of securing the elastic member.

FIG. 9 is a cross-sectional view for explaining a structure of attachment the elastic members 50 on the back yoke 70. FIG. 10 is a perspective view for explaining a structure of securing the elastic members 50. FIG. 11 is a cross-sectional view for explaining the structure of securing the elastic members 50.

Each view in FIGS. 9 and 11 shows the same cross section as the cross section taken along line A-A in FIG. 2.

As shown in FIG. 9, the vibrator attachment part 55 of each elastic member 50 is inserted into the inside of the holding part 75, while being inclined in such a manner that its bottom faces sideward (step S11). Then, the first projecting part 58 of the vibrator attachment part 55 is squeezed into the first hole 78 so as to be fitted therein. Here, the elastic member 50 is elastically deformed in an appropriate manner.

Next, with the first projecting part 58 fitted in the first hole 78, the vibrator attachment part 55 is rotated as indicated by the arrow in the figure so as to move the upper part of the vibrator attachment part 55 upward (step S11 to step S12). Here, the elastic member 50 is elastically deformed in an appropriate manner. Here, as described above, since the first hole 78 is extended from the bent-inward part 77 to the side face part 76 of the holding part 75, the vibrator attachment part 55 can be rotated while the first projecting part 58 is inserted in the first hole 78. Thus, this process can be carried out easily. At this time, for example, the first projecting part 58 fitted in the first hole 78 is displaced from an outer side towards an inner side of the back yoke 70.

The vibrator attachment part 55 is rotated so as to move the upper part of the vibrator attachment part 55 upward, and then the second projecting part 59 is inserted into the second hole 79 (step S13). Thereby, the first projecting part 58 is fitted in the first hole 78, and the second projecting part 59 is fitted in the second hole 79. In this state, the vibrator attachment part 55, which had been elastically deformed, has returned to roughly the natural state. (A part in contact with the inner face of the holding part 75 may be elastically deformed slightly from the natural state). Thus, the vibrator attachment part 55 is held by being sandwiched from above and below by the holding part 75. By attaching the vibrator attachment part 55 to the holding part 75 with the two projecting parts 58 and 59 fitted in the two holes 78 and 79, each elastic member 50 is positioned in the front-back direction with respect to the back yoke 70.

In a state that the vibrator attachment parts 55 are held by the holding parts 75 in this manner, the weight 81 and the magnet 60 are disposed at the planar part 71 as shown in FIG. 10.

As shown in FIG. 11, in the state that the vibrator attachment parts are attached to the holding parts 75, a distance D1 between the inner side faces of the vibrator attachment part 55a and the vibrator attachment part 55b is slightly smaller than a width dimension D2 of the weight 81 in the right-left direction (step S14). Thereby, when the weight 81 and the magnet 60 are disposed at the planar part 71, the right and left side end portions of the weight 81 are brought into contact with the inner side faces of the vibrator attachment parts 55, and the vibrator attachment parts 55 are pressed against the side face parts 76. Thus, the vibrator attachment part 55 is positioned by being sandwiched between the side parts of the weight 81 and the inner faces of the side face parts 76 of the holding parts 75.

As described above, in the vibrator unit 5, the elastic members 50 are coupled to the back yoke 70 by being fitted in the holding parts 75 formed in the back yoke 70. Thus, when the vibrator 80 vibrates, the elastic members 50 do not deform non-uniformly and thus a local fatigue is less likely to occur in the elastic members 50. Thus, it is possible to improve the durability of the vibrator unit 5 and the vibration generator 1.

The elastic members 50 can be assembled to the back yoke 70 in a facilitated manner by being positioned with the projecting parts 58 and 59 being fitted in the holes 78 and 79. Here, since the first projecting parts 58 are provided further outward with respect to the second projecting parts 59, assembly of the vibrator unit 5 can be further facilitated. Particularly, each first projecting part 58 is located at a position closer to the outer side face of the vibrator attachment part 55, and each second projecting part 59 is located at a position closer to the inner side face of the vibrator attachment part 55. Accordingly, the amount of elastic deformation of the elastic member 50 required when the projecting parts 58 and 59 are fitted in the holes 78 and 79 is decreased, which thus facilitates the assembly.

Moreover, the elastic members 50 are positioned in the right-left direction by the weight part attached to the back yoke 70. Therefore, a state that the elastic members 50 are positively held such that they are not detached from the holding parts 75 is kept, and thus the reliability of the vibrator unit 5 and the vibration generator 1 is improved. Furthermore, because the elastic members 50 are held by the holding parts 75 in this manner, the holding parts 75 can be formed into a relatively simple shape that merely surrounds the three sides of the vibrator attachment parts 55. Thus, the back yoke 70 can be easily manufactured. Further, since it is not necessary to provide a component (part of the holding parts 75 or another component) for securing the vibrator attachment parts 55 on the holding parts 75 between the vibrator attachment parts 55 and the weight part, a space for disposing the weight part is ensured and the dimension of the vibration generator 1 in the right-left direction is decreased, thereby the vibration generator 1 is miniaturized.

Since each first hole 78 is extended outward and formed to cut a part of the side face part 76, assembly of the vibrator unit 5 as described above is facilitated and bending processing from the side face part 76 to the bent-inward part 77 is also facilitated.

The right and left elastic members 50a and 50b have the same shape. Thus, the elastic members 50 can be manufactured at low cost.

DESCRIPTION OF MODIFICATION

In addition, the shape of the holding parts of the back yoke is not limited to the above-described shape. For example, the side face parts 76 of the back yoke do not need to be flat and may be curved. The shape of the holes 78 and 79 are not limited to the above-described shape.

The number of the holes into which the projecting parts of the vibrator attachment parts are fitted may be one, or three or more. That is, the shapes and the numbers of the projecting parts and the holes can be appropriately changed such that the vibrator attachment parts are held by the holding parts in a state that the projecting parts are fitted in the holes.

Figure 12:
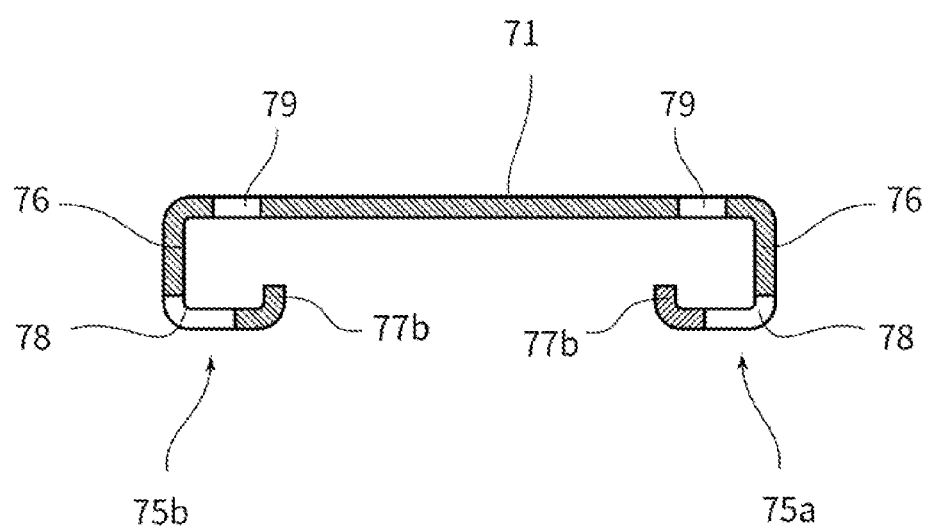
FIG. 12 is a cross-sectional view showing one example of a back yoke of a vibration generator in accordance with a modification of the present embodiment.
Figure 12:

FIG. 12 is a cross-sectional view showing one example of a back yoke 370 of the vibration generator 1 in accordance with one modification of the present embodiment.

The cross section shown in FIG. 12 corresponds to the above-described cross section shown in FIG. 7. As shown in FIG. 12, in the back yoke 370, a bent-inward part 77b of each holding part 75 includes an inner end part having a shape bending upward. By providing the bent-inward part 77b with a portion bent upward in this manner, the vibrator attachment parts 55 can be positioned in the right-left direction in a state that the vibrator attachment parts 55 are attached to the holding parts 75. Thus, the vibrator attachment parts 55 do not need to be pressed against the side face parts 76 by means of the weight part, and the shape and the configuration of the weight part can be appropriately set.

Others

The vibration generator may be constituted by suitably combining individual features of the embodiment and its modification described above. For example, a double-sided substrate such as a glass epoxy substrate may be used instead of the flexible printed circuit board. In this case, the double-sided substrate can be used as a part of the housing. The use of the double-sided substrate in this manner can reduce the cost for manufacturing the vibration generator.

The frame does not need to be provided with the upper face or the bottom face and may be such a frame that surrounds the periphery of the vibrator unit in a planar view.

The circuit board does not need to be provided. The bottom plate does not need to cover the whole face of the bottom of the frame but may be disposed at a portion of the bottom of the frame. The number of the coils may be plural, and also the number of the magnets may be plural. The positions of the coils and the arrangement of the magnetic poles can be appropriately set so as to make the vibration generator operable.

The number of the housing attachment parts and the number of the arm parts are only required to be two or more. The components corresponding to each of the elastic members in the above-described embodiment does not need to be integrally formed and may be constituted by assembling a plurality of components.

The number of the elastic members and the number of the holding parts for holding its vibrator attachment parts may be one, or three or more.

The vibrator unit may be attached to the bottom plate.

The weight may be disposed at the center of the magnet, etc. The weight may be disposed in a portion of the magnet which does not greatly affect the generation of force for moving the vibrator. Thereby, it is possible to constitute the vibration generator that can generate a big vibration force whilst miniaturizing the vibrator. The weight also does not need to be provided.

The vibration generator which can drive the vibrator may be manufactured by mounting the coil on the main substrate of an apparatus using a vibration, etc., and attaching the vibrator unit to the housing, and attaching the housing to the main substrate. In other words, the vibration generator may be constituted by using the coil mounted on the substrate of other apparatus. In this case, the vibrator unit may be directly attached to the substrate of other apparatus with the substrate being used as the housing.

The configuration of the above vibrator unit is not limited to that of the vibrator unit for the vibration generator described above, but can be widely applied. That is, the vibrator unit can be constituted such that the vibrator in which the magnet is provided can be displaced via the arm parts with respect to a portion supported by the frame. By using the vibrator as a movable element, such a vibrator unit can be used for other various types of apparatuses, such as an actuator driven using magnetism, or an apparatus which suitably displaces a vibrator in a predetermined direction. The vibrator unit constituted as described above also exerts the similar effect as that described above, even in other apparatuses different from the above vibration generator.

The vibration generator is not limited to a small vibration generator described above. A large vibration generator having the same basic structure may be constituted. In this case, the same effect as that described above also can be achieved.

It should be understood that the embodiment described above is illustrative in every respect and not restrictive. The scope of the present disclosure is defined by the claims, rather than the above description, and is intended to include any modifications within the scope and meanings equivalent to the claims.

What is claimed is:

1. A vibrator unit capable of being attached to a housing of a vibration generator, the vibrator unit comprising:
    a vibrator including a magnet and a back yoke arranged on or above the magnet; and
    an elastic member including:
        a vibrator attachment part attached to the vibrator;
        a housing attachment part attached to the housing; and
        an arm part coupling the vibrator attachment part and the housing attachment part, said arm part displaceably supporting the vibrator attachment part at least in a horizontal direction with respect to the housing attachment part,
    the back yoke including a planar part arranged on or above the magnet and a holding part bending the planar part toward a frame from the planar part,
    the vibrator attachment part being held and embraced by the holding part,
    the holding part includes a hole,
    the vibrator attachment part includes a projecting part, and
    the projecting part is fitted in the hole.

2. The vibrator unit in accordance with claim 1, wherein the elastic member is a single molded body formed with an elastic body, and
the housing attachment part, the arm part and the vibrator attachment part are mutually coupled.

3. The vibrator unit in accordance with claim 1, wherein two of the arm parts are coupled to two portions of the vibrator attachment part, respectively, and
two of the housing attachment parts are coupled to the two arm parts, respectively.

4. The vibrator unit in accordance with claim 1, wherein the vibrator unit includes two of the elastic members, and
the holding part arranged at a first side part, and
the holding part arranged at a second side part of the back yoke, the second side part being at a side opposite to the first side part, and
the respective vibrator attachment parts of the two elastic members are attached to the two holding parts at the first side part and the second side part, respectively.

5. The vibrator unit in accordance with claim 1, wherein the vibrator unit further includes a weight disposed at an outer periphery of the magnet, and
the vibrator attachment part is sandwiched between a side part of the weight and a part of the holding part.

6. A vibration generator comprising:
a housing;
the vibrator unit in accordance with claim 1;
an elastic member; and
a coil configured to allow a current to flow through to change at least one of a position and a posture of the vibrator unit with respect to the housing, wherein
the elastic member a vibrator attachment part attached to the vibrator, a housing attachment part attached to the housing, and an arm part coupling the vibrator attachment part and the housing attachment part, said arm part displaceably supporting the vibrator attachment part at least in a horizontal direction with respect to the housing attachment part.

7. A vibrator unit capable of being attached to a housing of a vibration generator, the vibrator unit comprising:
    a vibrator including a magnet and a back yoke arranged on or above the magnet; and
    an elastic member including:
        a vibrator attachment part attached to the vibrator;
        a housing attachment part attached to the housing; and
        an arm part coupling the vibrator attachment part and the housing attachment part, said arm part displaceably supporting the vibrator attachment part at least in a horizontal direction with respect to the housing attachment part,
    the back yoke including a planar part arranged on or above the magnet and a holding part bending the planar part toward a frame from the planar part,
    the vibrator attachment part being held and embraced by the holding part,
    the holding part includes a first part having a planar part and a lateral face and a second part bent toward the inside of the vibrator from the end portion of the side face part,
    the magnet is arranged at the first part,
    one of the first part and the second part includes a first hole, and the other of the first part and the second part includes a second hole, and
    the vibrator attachment part includes a first projecting part fitted in the first hole and a second projecting part fitted in the second hole.

8. The vibrator unit in accordance with claim 7, wherein the first projecting part is arranged closer to a side end portion of the holding part compared to the second projecting part.

9. The vibrator unit in accordance with claim 7, wherein
the first hole has a shape extending outward in the back yoke, with respect to a shape having a same dimension as a dimension of the first projecting part, and
the vibrator attachment part attached to the vibrator is rotatable with the first projection being inserted in the first hole.

10. The vibrator unit in accordance with claim 7, wherein
the elastic member is a single molded body formed with an elastic body, and
the housing attachment part, the arm part and the vibrator attachment part are mutually coupled.

11. The vibrator unit in accordance with claim 7, wherein
two of the arm parts are coupled to two portions of the vibrator attachment part, respectively, and
two of the housing attachment parts are coupled to the two arm parts, respectively.

12. The vibrator unit in accordance with claim 7, wherein
the vibrator unit includes two of the elastic members, and
the holding part arranged at a first side part, and
the holding part arranged at a second side part of the back yoke, the second side part being at a side opposite to the first side part, and
the respective vibrator attachment parts of the two elastic members are attached to the two holding parts at the first side part and the second side part, respectively.

13. The vibrator unit in accordance with claim 7, wherein
the vibrator unit further includes a weight disposed at an outer periphery of the magnet, and
the vibrator attachment part is sandwiched between a side part of the weight and a part of the holding part.

14. A vibration generator comprising:
a housing;
the vibrator unit in accordance with claim 7;
an elastic member; and
a coil configured to allow a current to flow through to change at least one of a position and a posture of the vibrator unit with respect to the housing, wherein
the elastic member includes a vibrator attachment part attached to the vibrator, a housing attachment part attached to the housing, and an arm part coupling the vibrator attachment part and the housing attachment part, said arm part displaceably supporting the vibrator attachment part at least in a horizontal direction with respect to the housing attachment part.

* * * * *